US012807903B2

(12) United States Patent
Takakuwa et al.

(10) Patent No.: US 12,807,903 B2
(45) Date of Patent: Nov. 24, 2026

(54) COMPOSITION FOR CLEANING SEMICONDUCTOR SUBSTRATE, AND CLEANING METHOD

(71) Applicant: MITSUBISHI GAS CHEMICAL COMPANY, INC., Tokyo (JP)

(72) Inventors: Hiroaki Takakuwa, Forest Grove, OR (US); Akinobu Horita, Forest Grove, OR (US); Takahiro Kikunaga, Forest Grove, OR (US)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 321 days.

(21) Appl. No.: 18/278,877

(22) PCT Filed: Mar. 4, 2022

(86) PCT No.: PCT/JP2022/009294
§ 371 (c)(1),
(2) Date: Aug. 25, 2023

(87) PCT Pub. No.: WO2022/191051
PCT Pub. Date: Sep. 15, 2022

(65) Prior Publication Data

US 2024/0132805 A1 Apr. 25, 2024
US 2024/0228912 A9 Jul. 11, 2024

Related U.S. Application Data

(60) Provisional application No. 63/157,857, filed on Mar. 8, 2021.

(51) Int. Cl.

| | |
|---|---|
| ***C11D 3/28*** | (2006.01) |
| ***C11D 3/00*** | (2006.01) |
| ***C11D 3/04*** | (2006.01) |
| ***C11D 3/20*** | (2006.01) |
| ***C11D 3/30*** | (2006.01) |
| ***C11D 3/43*** | (2006.01) |

(52) U.S. Cl.
CPC .............. *C11D 3/28* (2013.01); *C11D 3/0073* (2013.01); *C11D 3/044* (2013.01); *C11D 3/2065* (2013.01); *C11D 3/30* (2013.01); *C11D 3/43* (2013.01); *C11D 2111/22* (2024.01)

(58) Field of Classification Search
CPC ......... C11D 3/28; C11D 3/0073; C11D 3/044; C11D 3/2065
See application file for complete search history.

(56) References Cited

U.S. PATENT DOCUMENTS

2004/0259745 A1* 12/2004 Asher .................. C11D 3/2068 510/170
2004/0259761 A1 12/2004 Yokoi et al.
2005/0197265 A1 9/2005 Rath et al.
2015/0152366 A1* 6/2015 Shimada ........... H01L 21/31111 438/618
2017/0183607 A1 6/2017 Shimada
2018/0037852 A1 2/2018 Thomas et al.
2019/0079409 A1 3/2019 Takahashi et al.

FOREIGN PATENT DOCUMENTS

JP 2006527783 A 12/2006
JP 2007526523 A 9/2007
JP 2019218548 A 12/2019
WO WO-2013187313 A1 12/2013
WO WO-2017208767 A1 12/2017

OTHER PUBLICATIONS

International Search Report issued Jun. 7, 2022 in PCT/JP2022/009294 (with English translation), 5 pages.

* cited by examiner

*Primary Examiner* — Angela C Brown-Pettigrew
(74) *Attorney, Agent, or Firm* — Element IP, PLC

(57) ABSTRACT

A cleaning composition for semiconductor substrates, containing an alkaline compound (A), a corrosion inhibitor (B), and water, wherein the alkaline compound (A) is at least one selected from the group consisting of a quaternary ammonium hydroxide (A1) and potassium hydroxide (A2), and the corrosion inhibitor (B) is at least one selected from the group consisting of 4-substituted pyrazoles, potassium tris(1-pyrazolyl)borohydride, 2-(4-thiazolyl)benzimidazole, and halogenated-8-hydroxyquinolines.

13 Claims, No Drawings

COMPOSITION FOR CLEANING SEMICONDUCTOR SUBSTRATE, AND CLEANING METHOD

TECHNICAL FIELD

The present invention relates to a cleaning composition for semiconductor substrates, and a cleaning method.

BACKGROUND ART

In conventional manufacturing of a semiconductor substrate having highly integrated semiconductor devices, a conductive thin film such as metal film as a conductive wiring material, an interlayer insulating film for insulation between conductive thin films, a hard mask, a sacrificial layer, etc., are formed on a substrate such as a silicon wafer, and then a photoresist is uniformly applied thereon to make a photosensitive layer, which is subjected to selective exposure and development to prepare a desired photoresist pattern. Subsequently, using the photoresist pattern as a mask, the substrate having a laminate including an interlayer insulating film, a hard mask, etc., is dry-etched to form a desired pattern on the substrate. Residues generated in the photoresist patterning and dry-etching (hereinafter referred to as "dry etching residues") are removed by oxygen plasma ashing, by a cleaning liquid or the like. The sequential steps described above are generally employed.

In the treatment with use of a cleaning liquid, it is known that a photoresist can be removed by using an alkaline cleaning liquid. The alkaline cleaning liquid, however, may cause damage to a metal layer in some cases. Accordingly, studies for enhancing cleaning performance while preventing deterioration or corrosion of the metal layer, etc., have been made.

For example, PTL1 discloses a treatment liquid for semiconductor devices containing an organic alkaline compound, a corrosion inhibitor, an organic solvent, Ca, Fe and Na for the purpose of improving corrosion inhibiting properties of a metal layer and resist removability.

Further, PTL2 discloses a peeling and cleaning liquid containing a quaternary ammonium hydroxide, a water-soluble organic solvent, water, a corrosion inhibitor, and potassium hydroxide at a content of 1 mass % or less relative to the total amount for the purpose of preventing deterioration of a low-k material and Cu and removing metal residues, etc.

CITATION LIST

Patent Literature

PTL1: International Publication No. WO 2017/208767
PTL2: Japanese Translation of PCT International Application Publication No. 2006-527783

SUMMARY OF INVENTION

Technical Problem

In recent years, the current density of metal wiring has increased due to progress of design rule miniaturization, so that countermeasures for electromigration, which causes a failure in metal wiring due to movement of atoms constituting the metal wiring when current flows in a metal wiring material, is more strongly required. Examples of the countermeasures include a method of forming a layer of cobalt or a cobalt alloy as a cap metal around a copper wiring, and a method of using cobalt or a cobalt alloy as the metal wiring material. However, by a conventional cleaning agent or cleaning method, it has been difficult to remove photoresist patterns and dry etching residues while suppressing corrosion of cobalt or a cobalt alloy. Accordingly, a cleaning agent capable of removing photoresist patterns and dry etching residues while suppressing corrosion of cobalt has been required.

The technical problem to be solved by the present invention is, therefore, to provide a cleaning composition for semiconductor substrates capable of suppressing corrosion of cobalt in cleaning of a semiconductor substrate containing cobalt.

Solution to Problem

The present invention provides the following cleaning compositions for semiconductor substrates.

<1> A cleaning composition for semiconductor substrates, containing an alkaline compound (A), a corrosion inhibitor (B), and water, wherein the alkaline compound (A) is at least one selected from the group consisting of a quaternary ammonium hydroxide (A1) and potassium hydroxide (A2), and the corrosion inhibitor (B) is at least one selected from the group consisting of 4-substituted pyrazoles, potassium tris(1-pyrazolyl)borohydride, 2-(4-thiazolyl)benzimidazole, and halogenated-8-hydroxyquinolines.

<2> The cleaning composition for semiconductor substrates according to item <1>, wherein the corrosion inhibitor (B) is at least one selected from the group consisting of 4-bromo-1H-pyrazole, 2-(4-thiazolyl)benzimidazole, 4-chloro-1H-pyrazole, 4-methylpyrazole, 8-hydroxy-7-iodoquinoline-5-sulfonic acid, 5-chloro-8-hydroxy-7-iodoquinoline, 5-chloro-8-hydroxyquinoline, 7-bromo-5-chloro-8-hydroxyquinoline, potassium tris(1-pyrazolyl)borohydride, and 5,7-diiodo-8-hydroxyquinoline.

<3> The cleaning composition for semiconductor substrates according to item <1> or <2>, wherein the content of the alkaline compound (A) in the cleaning composition for semiconductor substrates is 0.005 to 35 mass %.

<4> The cleaning composition for semiconductor substrates according to any of items <1> to <3>, wherein the content of the corrosion inhibitor (B) in the cleaning composition for semiconductor substrates is 0.05 to 3 mass %.

<5> The cleaning composition for semiconductor substrates according to any of items <1> to <4>, wherein the content of water in the cleaning composition for semiconductor substrates is 7 to 99.945 mass %.

<6> The cleaning composition for semiconductor substrates according to any of items <1> to <5>, further containing an organic solvent (C), wherein the content of the organic solvent (C) in the cleaning composition for semiconductor substrates is 0.0001 to 40 mass %.

<7> The cleaning composition for semiconductor substrates according to item <6>, wherein the organic solvent (C) is at least one selected from the group consisting of alkylene glycol alkyl ethers and alcohols.

<8> The cleaning composition for semiconductor substrates according to any of items <1> to <7>, having a pH of 7 or more.

<9> The cleaning composition for semiconductor substrates according to any of items <1> to <8>, wherein the quaternary ammonium hydroxide (A1) is at least one selected from the group consisting of tetramethylammonium hydroxide, tetraethylammonium hydroxide, tetrapropylammonium hydroxide, tetrabutylammonium hydroxide, and benzyltrimethylammonium hydroxide.

<10> The cleaning composition for semiconductor substrates according to any of items <1> to <9>, for use in cleaning semiconductor substrates containing cobalt.

<11> A method of cleaning a semiconductor substrate containing cobalt by using the cleaning composition for semiconductor substrates according to any of items <1> to <10>.

<12> A method of cleaning a semiconductor substrate for removing at least one selected from the group consisting of dry etching residues and a photoresist in a semiconductor substrate by using the cleaning composition for semiconductor substrates according to any of items <1> to <10>.

<13> A method for producing a semiconductor substrate, comprising a step of removing at least one selected from the group consisting of dry etching residues and a photoresist in a semiconductor substrate by using the cleaning composition for semiconductor substrates according to any of items <1> to <10>.

<14> A method for suppressing corrosion of cobalt, comprising using at least one corrosion inhibitor (B) selected from the group consisting of 4-substituted pyrazoles, potassium tris(1-pyrazolyl)borohydride, 2-(4-thiazolyl)benzimidazole, and halogenated-8-hydroxyquinolines in cleaning of a semiconductor substrate containing cobalt by using a composition containing at least one alkaline compound (A) selected from the group consisting of a quaternary ammonium hydroxide (A1) and potassium hydroxide (A2), and water, to thereby suppress corrosion of cobalt.

Advantageous Effects of Invention

The cleaning composition for semiconductor substrates of the present invention is capable of suppressing corrosion of cobalt in cleaning of a semiconductor substrate containing cobalt.

DESCRIPTION OF EMBODIMENTS

The present invention is a cleaning composition for semiconductor substrates, containing an alkaline compound (A), a corrosion inhibitor (B), and water, wherein the alkaline compound (A) is at least one selected from the group consisting of a quaternary ammonium hydroxide (A1) and potassium hydroxide (A2), and the corrosion inhibitor (B) is at least one selected from the group consisting of 4-substituted pyrazoles, potassium tris(1-pyrazolyl)borohydride, 2-(4-thiazolyl)benzimidazole, and halogenated-8-hydroxyquinolines; and a cleaning method, comprising using the cleaning composition for semiconductor substrates.

[Cleaning Composition for Semiconductor Substrates]

The cleaning composition for semiconductor substrates of the present invention contains an alkaline compound (A), a corrosion inhibitor (B), and water, wherein the alkaline compound (A) is at least one selected from the group consisting of a quaternary ammonium hydroxide (A1) and potassium hydroxide (A2), and the corrosion inhibitor (B) is at least one selected from the group consisting of 4-substituted pyrazoles, potassium tris(1-pyrazolyl)borohydride, 2-(4-thiazolyl)benzimidazole, and halogenated-8-hydroxyquinolines. It is preferable that the cleaning composition for semiconductor substrates of the present invention contain an alkaline compound (A), a corrosion inhibitor (B), and water, wherein the alkaline compound (A) is at least one selected from the group consisting of a quaternary ammonium hydroxide (A1) and potassium hydroxide (A2), and the corrosion inhibitor (B) is at least one selected from the group consisting of 4-bromo-1H-pyrazole, 2-(4-thiazolyl)benzimidazole, 4-chloro-1H-pyrazole, 4-methylpyrazole, 8-hydroxy-7-iodoquinoline-5-sulfonic acid, 5-chloro-8-hydroxy-7-iodoquinoline, 5-chloro-8-hydroxyquinoline, 7-bromo-5-chloro-8-hydroxyquinoline, potassium tris(1-pyrazolyl) borohydride, and 5,7-diiodo-8-hydroxyquinoline.

<Alkaline Compound (A)>

The cleaning composition for semiconductor substrates of the present invention contains an alkaline compound (A).

The alkaline compound (A) is at least one selected from the group consisting of a quaternary ammonium hydroxide (A1) and potassium hydroxide (A2).

Due to containing the alkaline compound (A), the cleaning composition for semiconductor substrates of the present invention is capable of effectively removing a photoresist and dry etching residues to suppress damage to a low dielectric constant interlayer insulating film and metal wiring.

The quaternary ammonium hydroxide (A1) and potassium hydroxide (A2) may be used alone or both of them may be used in combination. In particular, the alkaline compound (A) containing both of the quaternary ammonium hydroxide (A1) and potassium hydroxide (A2) is preferred because corrosion of metals constituting a semiconductor substrate is reduced.

The quaternary ammonium hydroxide (A1) is not particularly limited, and it is preferably at least one selected from the group consisting of tetramethylammonium hydroxide, tetraethylammonium hydroxide, tetrapropylammonium hydroxide, tetrabutylammonium hydroxide, and benzyltrimethylammonium hydroxide, and more preferably tetramethylammonium hydroxide.

The content of the alkaline compound (A) in the cleaning composition for semiconductor substrates is preferably 0.005 to 35 mass %, more preferably 0.3 to 30 mass %, still more preferably 3 to 25 mass %, and furthermore preferably 5 to 20 mass %.

The content of the quaternary ammonium hydroxide (A1) in the cleaning composition for semiconductor substrates is preferably 1 to 30 mass %, more preferably 2 to 25 mass %, and still more preferably 3 to 20 mass %.

The content of the potassium hydroxide (A2) in the cleaning composition for semiconductor substrates is preferably 0.005 to 5 mass %, more preferably 0.01 to 4.5 mass %, still more preferably 0.05 to 4 mass %, and furthermore preferably 0.1 to 4 mass %.

With a content of the alkaline compound (A) in the range, the solubility of the corrosion inhibitor (B) is improved, which is favorable.

With a content of the quaternary ammonium hydroxide (A1) in the range, the solubility of the corrosion inhibitor (B) is improved, which is favorable.

With a content of the potassium hydroxide (A2) in the range, the solubility of the corrosion inhibitor (B) is improved, and the performance for removing a sacrificial layer is enhanced, which is favorable.

<Corrosion Inhibitor (B)>

The cleaning composition for semiconductor substrates of the present invention contains a corrosion inhibitor (B), wherein the corrosion inhibitor (B) is at least one selected from the group consisting of 4-substituted pyrazoles, potassium tris(1-pyrazolyl)borohydride, 2-(4-thiazolyl)benzimidazole, and halogenated-8-hydroxyquinolines.

Among them, a preferred corrosion inhibitor (B) is at least one selected from the group consisting of 4-bromo-1H-pyrazole, 2-(4-thiazolyl)benzimidazole, 4-chloro-1H-pyrazole, 4-methylpyrazole, 8-hydroxy-7-iodoquinoline-5-sulfonic acid, 5-chloro-8-hydroxy-7-iodoquinoline, 5-chloro-8-hydroxyquinoline, 7-bromo-5-chloro-8-hydroxyquinoline, potassium tris(1-pyrazolyl)borohydride, and 5,7-diiodo-8-hydroxyquinoline.

Due to containing the corrosion inhibitor (B), the cleaning composition for semiconductor substrates of the present invention is capable of suppressing corrosion of cobalt especially in cleaning of a semiconductor substrate containing cobalt.

Although the reason why the cleaning composition for semiconductor substrates of the present invention is capable of particularly suppressing corrosion of cobalt is not apparent, it is presumed that the corrosion inhibitor (B) is adsorbed on the surface of cobalt to form a passivation layer, so that elution of cobalt into the cleaning composition for semiconductor substrates is suppressed.

The corrosion inhibitor (B) is at least one selected from the group consisting of 4-substituted pyrazoles, potassium tris(1-pyrazolyl)borohydride, 2-(4-thiazolyl)benzimidazole, and halogenated-8-hydroxyquinolines, and the corrosion inhibitor (B) preferred is at least one selected from the group consisting of 4-bromo-1H-pyrazole, 2-(4-thiazolyl)benzimidazole, 4-chloro-1H-pyrazole, 4-methylpyrazole, 8-hydroxy-7-iodoquinoline-5-sulfonic acid, 5-chloro-8-hydroxy-7-iodoquinoline, 5-chloro-8-hydroxyquinoline, 7-bromo-5-chloro-8-hydroxyquinoline, potassium tris(1-pyrazolyl)borohydride, and 5,7-diiodo-8-hydroxyquinoline.

Among them, from the viewpoint of suppressing corrosion of cobalt constituting a semiconductor substrate, at least one selected from the group consisting of 4-bromo-1H-pyrazole, 2-(4-thiazolyl)benzimidazole, 4-chloro-1H-pyrazole, 4-methylpyrazole, 5-chloro-8-hydroxy-7-iodoquinoline, 5-chloro-8-hydroxyquinoline, 7-bromo-5-chloro-8-hydroxyquinoline, potassium tris(1-pyrazolyl)borohydride, and 5,7-diiodo-8-hydroxyquinoline is preferred, and at least one selected from the group consisting of 4-bromo-1H-pyrazole, 2-(4-thiazolyl)benzimidazole, 4-chloro-1H-pyrazole, 4-methylpyrazole, 5-chloro-8-hydroxy-7-iodoquinoline, 7-bromo-5-chloro-8-hydroxyquinoline, potassium tris(1-pyrazolyl)borohydride, and 5,7-diiodo-8-hydroxyquinoline is more preferred. From the viewpoint of suppressing corrosion of cobalt in various cleaning compositions for semiconductor substrates, at least one selected from the group consisting of 4-bromo-1H-pyrazole, 2-(4-thiazolyl)benzimidazole, 4-chloro-1H-pyrazole, 4-methylpyrazole, 5-chloro-8-hydroxy-7-iodoquinoline, 7-bromo-5-chloro-8-hydroxyquinoline, and potassium tris(1-pyrazolyl)borohydride is still more preferred. From the viewpoint of suppressing corrosion of cobalt even by a small amount of addition, at least one selected from the group consisting of 4-bromo-1H-pyrazole, 4-chloro-1H-pyrazole, 4-methylpyrazole, 5-chloro-8-hydroxy-7-iodoquinoline, 7-bromo-5-chloro-8-hydroxyquinoline, and potassium tris(1-pyrazolyl)borohydride is furthermore preferred; at least one selected from the group consisting of 4-bromo-1H-pyrazole, 4-chloro-1H-pyrazole, 4-methylpyrazole, 7-bromo-5-chloro-8-hydroxyquinoline, and potassium tris(1-pyrazolyl)borohydride is furthermore preferred; and at least one selected from the group consisting of 4-chloro-1H-pyrazole, 7-bromo-5-chloro-8-hydroxyquinoline, and potassium tris(1-pyrazolyl)borohydride is furthermore preferred.

In the case where the cleaning composition for semiconductor substrates of the present invention contains both of the quaternary ammonium hydroxide (A1) and potassium hydroxide (A2) as the alkaline compound (A), the corrosion inhibiting properties of each compound of the corrosion inhibitor (B) vary depending on the mass ratio between the quaternary ammonium hydroxide (A1) and potassium hydroxide (A2) [(A1)/(A2)]. Although the reason is not apparent, it is presumed that potassium ions and tetramethylammonium ions coordinated with the corrosion inhibitor or adsorbed on the surface of cobalt have an effect.

In the case where the mass ratio between the quaternary ammonium hydroxide (A1) and potassium hydroxide (A2) [(A1)/(A2)] is 10 or more, the corrosion inhibitor (B) is preferably at least one selected from the group consisting of 4-bromo-1H-pyrazole, 2-(4-thiazolyl)benzimidazole, 4-chloro-1H-pyrazole, 4-methylpyrazole, 5-chloro-8-hydroxy-7-iodoquinoline, 7-bromo-5-chloro-8-hydroxyquinoline, potassium tris(1-pyrazolyl)borohydride, and 5,7-diiodo-8-hydroxyquinoline; more preferably at least one selected from the group consisting of 4-bromo-1H-pyrazole, 4-chloro-1H-pyrazole, 4-methylpyrazole, 5-chloro-8-hydroxy-7-iodoquinoline, 7-bromo-5-chloro-8-hydroxyquinoline, potassium tris(1-pyrazolyl)borohydride, and 5,7-diiodo-8-hydroxyquinoline; and still more preferably at least one selected from the group consisting of 4-chloro-1H-pyrazole, 5-chloro-8-hydroxy-7-iodoquinoline, 7-bromo-5-chloro-8-hydroxyquinoline, and 5,7-diiodo-8-hydroxyquinoline.

In the case where the mass ratio between the quaternary ammonium hydroxide (A1) and potassium hydroxide (A2) [(A1)/(A2)] is less than 10, the corrosion inhibitor (B) is preferably at least one selected from the group consisting of 4-bromo-1H-pyrazole, 2-(4-thiazolyl)benzimidazole, 4-chloro-1H-pyrazole, 4-methylpyrazole, 5-chloro-8-hydroxyquinoline, and potassium tris(1-pyrazolyl)borohydride; more preferably at least one selected from the group consisting of 4-bromo-1H-pyrazole, 2-(4-thiazolyl)benzimidazole, 4-chloro-1H-pyrazole, and 4-methylpyrazole; and still more preferably at least one selected from the group consisting of 4-bromo-1H-pyrazole, and 4-chloro-1H-pyrazole.

As described above, the corrosion inhibitor (B) used in the cleaning composition for semiconductor substrates of the present invention is at least one selected from the group consisting of 4-substituted pyrazoles, potassium tris(1-pyrazolyl)borohydride, 2-(4-thiazolyl)benzimidazole, and halogenated-8-hydroxyquinolines. Among the 4-substituted pyrazoles, 4-halogenated pyrazoles with the 4-position substituted with a halogen are preferred, and 4-chloropyrazoles with the 4-position substituted with a chlorine atom are more preferred. Also, among the halogenated-8-hydroxyquinolines, 7-halogenated-8-hydroxyquinolines with the 7-position substituted with a halogen are preferred, and 5-chloro-7-halogenated-8-hydroxyquinolines with the 5-position substituted with chlorine are more preferred.

The content of the corrosion inhibitor (B) in the cleaning composition for semiconductor substrates is preferably 0.0001 to 10 mass %, more preferably 0.001 to 5 mass %, still more preferably 0.005 to 5 mass %, furthermore preferably 0.01 to 5 mass %, furthermore preferably 0.01 to 3 mass %, furthermore preferably 0.05 to 3 mass %, furthermore preferably 0.1 to 2.5 mass %, and furthermore preferably 0.2 to 2.0 mass %.

The content of 7-bromo-5-chloro-8-hydroxyquinoline as a specific example of the compounds in the cleaning composition for semiconductor substrates is preferably 0.01 to 2 mass %, more preferably 0.05 to 1 mass %, still more preferably 0.1 to 0.5 mass %, and furthermore preferably 0.15 to 0.3 mass %. The content of 4-chloro-1H-pyrazole in the cleaning composition for semiconductor substrates is preferably 0.1 to 5 mass %, more preferably 0.3 to 4 mass %, still more preferably 0.5 to 3 mass %, and furthermore preferably 1.0 to 2.5 mass %. The content of potassium tris(1-pyrazolyl)borohydride in the cleaning composition for semiconductor substrates is preferably 0.01 to 2 mass %, more preferably 0.05 to 1 mass %, still more preferably 0.1 to 0.5 mass %, and furthermore preferably 0.15 to 0.3 mass %.

The content of 5-chloro-8-hydroxy-7-iodoquinoline in the cleaning composition for semiconductor substrates is preferably 0.01 to 2 mass %, more preferably 0.05 to 1 mass %, still more preferably 0.1 to 0.5 mass %, and furthermore preferably 0.15 to 0.3 mass %. The content of 5,7-diiodo-8-hydroxyquinoline in the cleaning composition for semiconductor substrates is preferably 0.01 to 2 mass %, more preferably 0.05 to 1 mass %, still more preferably 0.1 to 0.5 mass %, and furthermore preferably 0.15 to 0.3 mass %.

The content of 4-bromo-1H-pyrazole in the cleaning composition for semiconductor substrates is preferably 0.1 to 5 mass %, more preferably 0.3 to 4 mass %, still more preferably 0.5 to 3 mass %, and furthermore preferably 1.0 to 2.5 mass %.

With a content of the corrosion inhibitor (B) in the range, the corrosion of cobalt is inhibited with improved economic performance.

<Water>

The cleaning composition for semiconductor substrates of the present invention contains water.

Although the water is not particularly limited, one from which metal ions, organic impurities, particles, etc., are removed by distillation, ion exchange treatment, filtering treatment, various adsorption treatments, etc., is preferred; pure water is more preferred; and ultrapure water is particularly preferred.

The content of water in the cleaning composition for semiconductor substrates is preferably 7 to 99.99 mass %, more preferably 7 to 99.945 mass %, and a balance excluding the alkaline compound (A) and the corrosion inhibitor (B) may be water.

In the case of using the following organic solvent (C), a balance excluding the alkaline compound (A), the corrosion inhibitor (B) and the organic solvent (C) may be water.

The content of water in the cleaning composition for semiconductor substrates is still more preferably 10 to 99 mass %, furthermore preferably 20 to 90 mass %, furthermore preferably 30 to 80 mass %, and furthermore preferably 40 to 70 mass %. With a water content in the range, the effect of the present invention can be exhibited with improved economic performance.

<Organic Solvent (C)>

It is preferable that the cleaning composition for semiconductor substrates of the present invention further contain an organic solvent (C), wherein the content of the organic solvent (C) in the cleaning composition for semiconductor substrates is preferably 0.0001 to 40 mass %.

The organic solvent (C) is preferably at least one selected from the group consisting of alkylene glycol alkyl ethers and alcohols, and more preferably alcohols.

Examples of the alcohols include a monohydric alcohol and a polyhydric alcohol, and a polyhydric alcohol is preferred.

Examples of the polyhydric alcohol include ethylene glycol, propylene glycol, diethylene glycol, dipropylene glycol, and glycerol.

Examples of the alkylene glycol alkyl ethers include polyalkylene glycol monoalkyl ether, monoalkylene glycol monoalkyl ether, polyalkylene glycol polyalkyl ether, and monoalkylene glycol polyalkyl ether, and polyalkylene glycol monoalkyl ether is preferred.

Examples of the polyalkylene glycol monoalkyl ether include diethylene glycol monomethyl ether, diethylene glycol monobutyl ether, and dipropylene glycol monomethyl ether.

The content of the organic solvent (C) in the cleaning composition for semiconductor substrates is preferably 0.0001 to 40 mass %, more preferably 1 to 40 mass %, still more preferably 10 to 37 mass %, and furthermore preferably 20 to 35 mass %. With a content of the organic solvent (C) in the range, damages to a metal wiring material are favorably suppressed.

<Characteristics of Cleaning Composition for Semiconductor Substrates, Etc.>

The pH of the cleaning composition for semiconductor substrates of the present invention is preferably 7 or more, more preferably 10 to 14, still more preferably 12 to 14, furthermore preferably 13 to 14, and furthermore preferably 13.5 to 14.

With a pH in the range, the cleaning performance for a photoresist can be enhanced, with corrosion of cobalt being prevented. Further, the cleaning performance for a sacrificial layer can be enhanced.

The cleaning composition for semiconductor substrates of the present invention is preferably used for cleaning a semiconductor substrate containing cobalt.

The cleaning composition for semiconductor substrates of the present invention can suppress corrosion of cobalt in cleaning of a semiconductor substrate containing cobalt. Incidentally, cobalt is used as metal wiring of a semiconductor substrate. Examples of cobalt include metal cobalt and a cobalt alloy.

In the cleaning composition for semiconductor substrates of the present invention, components other than the components described above may be compounded in a range without spoiling the purpose of the present invention. For example, a surfactant, a defoaming agent, a dissolved oxygen remover, etc., may be added.

It is preferable that the following compounds be substantially not contained in the cleaning composition for semiconductor substrates of the present invention, though having a structure similar to the corrosion inhibitor (B). Examples of the compound that is preferably not contained in the cleaning composition for semiconductor substrates include 1-amino-2-naphthol-4-sulfonic acid, sodium m-nitrobenzenesulfonate, disodium 3-hydroxy-4-nitroso-2,7-naphthalenedisulfonate, 2-pyridinecarboxylic acid, dimethyl acetylenedicarboxylate, 5-chlorobenzotriazol, sodium 1-(m-sulfophenyl)-5-mercapto-1H-tetrazole, 3-nitropyrazole, and N,N'-carbonyldiimidazole. By not containing these, the corrosion of cobalt can be well suppressed.

It is also preferable that the cleaning composition for semiconductor substrates of the present invention substantially not contain sodium hydroxide. By not containing sodium hydroxide, the effect of the cleaning composition on the electric properties of a semiconductor can be suppressed to improve the yield.

[Method of Cleaning Semiconductor Substrate]

The method of cleaning a semiconductor substrate of the present invention is a cleaning method for cleaning a semiconductor substrate by using the cleaning composition for semiconductor substrates. In particular, a cleaning method for cleaning a semiconductor substrate containing cobalt by using the cleaning composition for semiconductor substrates is preferred. According to the cleaning method of the present invention, corrosion of cobalt can be suppressed in cleaning a semiconductor substrate containing cobalt. It is to be noted that cobalt is used as metal wiring, a barrier metal, a plating seed layer, etc., of a semiconductor substrate. Examples of cobalt include metal cobalt and a cobalt alloy.

It is also preferable that the method of cleaning a semiconductor substrate of the present invention be a cleaning method for removing at least one selected from the group consisting of dry etching residues and a photoresist in a semiconductor substrate by using the cleaning composition for semiconductor substrates. In particular, in order to exhibit the maximum effect of the present invention, it is more preferable that the method of cleaning a semiconductor substrate of the present invention be a cleaning method for removing at least one selected from the group consisting of dry etching residues and a photoresist in a semiconductor substrate by cleaning a semiconductor substrate containing cobalt by using the cleaning composition for semiconductor substrates.

In the cleaning method of the present invention, the temperature during cleaning is not particularly limited, preferably 10 to 85° C., and more preferably 30 to 70° C. Also, ultrasonic waves may be used during cleaning.

In the cleaning method of the present invention, the cleaning time is not particularly limited, preferably 0.1 to 120 minutes, and more preferably 1 to 60 minutes. It is preferable that rinsing be further performed with a rinsing liquid containing water, alcohol, etc., after cleaning.

In the cleaning method of the present invention, the method for contacting the cleaning composition for semiconductor substrates of the present invention with a semiconductor substrate is not particularly limited. For example, a method for contacting the cleaning composition for semiconductor substrates of the present invention with a semiconductor substrate by a form such as dripping (single wafer spinning treatment) or spraying (atomizing treatment), or a method for immersing a semiconductor substrate in the cleaning composition for semiconductor substrates of the present invention may be employed. In the present invention, any one of the methods may be employed.

[Method for Suppressing Corrosion of Cobalt]

The corrosion inhibitor (B) is capable of well suppressing corrosion of cobalt in cleaning of a semiconductor substrate. In other words, the method for suppressing corrosion of cobalt of the present invention is a method for suppressing corrosion of cobalt by at least one corrosion inhibitor (B) selected from the group consisting of 4-substituted pyrazoles, potassium tris(1-pyrazolyl)borohydride, 2-(4-thiazolyl)benzimidazole, and halogenated-8-hydroxyquinolines in cleaning of a semiconductor substrate containing cobalt by using a composition containing at least one alkaline compound (A) selected from the group consisting of a quaternary ammonium hydroxide (A1) and potassium hydroxide (A2), and water.

The corrosion inhibitor (B) and the alkaline compound (A) for use in the present method are the same as described in the section [Cleaning composition for semiconductor substrates], and the same applies to the preferred compounds and the preferred ranges.

Incidentally, use of the corrosion inhibitor (B) allows the corrosion of cobalt be suppressed to at least less than ½ (50%) in cleaning of a semiconductor substrate.

[Method for Producing Semiconductor Substrate]

A method for producing a semiconductor substrate of the present invention comprises a step of removing at least one selected from the group consisting of dry etching residues and a photoresist in the semiconductor substrates, by using the cleaning composition for semiconductor substrates.

In other words, the method for producing a semiconductor substrate of the present invention comprises a step of removing at least one selected from the group consisting of dry etching residues and a photoresist in a semiconductor substrate by using a cleaning composition for semiconductor substrates containing at least one alkaline compound (A) selected from the group consisting of a quaternary ammonium hydroxide (A1) and potassium hydroxide (A2), at least one corrosion inhibitor (B) selected from the group consisting of 4-substituted pyrazoles, potassium tris(1-pyrazolyl)borohydride, 2-(4-thiazolyl)benzimidazole, and halogenated-8-hydroxyquinolines, and water.

A specific method for producing a semiconductor substrate is shown as follows.

First, on a substrate of silicon or the like having a barrier metal, metal wiring, a low dielectric constant interlayer insulating film, and a cap metal as needed, a barrier insulating film, a low dielectric constant interlayer insulating film, a hard mask and a photoresist are laminated. Alternatively, on the substrate, a barrier insulating film, a low dielectric constant interlayer insulating film, a hard mask, a sacrificial layer and a photoresist are laminated. And then selective exposure and development are applied to the photoresist to form a photoresist pattern. Subsequently, using the photoresist pattern as an etching mask, dry etching is applied to the hard mask, the low dielectric constant interlayer insulating film and the barrier insulating film. Subsequently, the step of removing at least one selected from the group consisting of dry etching residues and a photoresist in the semiconductor substrate described above is performed by using the cleaning composition for semiconductor substrates to obtain a semiconductor substrate having a desired metal wiring pattern.

Examples of the substrate material for use include silicon, amorphous silicon, polysilicon, and glass. Examples of the barrier metal for use include tantalum, tantalum nitride, ruthenium, manganese, magnesium, cobalt, and oxides thereof. Examples of the metal wiring for use include copper or a copper alloy, copper or a copper alloy with cobalt or a cobalt alloy formed thereon as a cap metal, and cobalt or a cobalt alloy. Examples of the low dielectric constant interlayer insulating film for use include polysiloxane-based OCD (trade name, manufactured by Tokyo Ohka Kogyo Co., Ltd.) and carbon-doped silicon oxide (SiOC)-based Black Diamond (trade name, manufactured by Applied Materials).

Examples of the barrier insulating film for use include silicon nitride, silicon carbide, and silicon nitride carbide. Examples of the hard mask for use include titanium and titanium nitride.

Examples of the sacrificial layer include an organosiloxane-based material.

Since the method for producing a semiconductor substrate of the present invention has a step of removing unnecessary components by using the cleaning composition for semiconductor substrates, a semiconductor substrate having high precision and high quality can be produced at a high yield rate.

EXAMPLES

The present invention is further described in detail with reference to Examples as follows, though the present invention is not limited thereto.

<Analysis Method and Evaluation Method>

(1) pH

The pH of a cleaning composition for semiconductor substrates was measured by glass electrode method (F-55S desktop pH meter manufactured by HORIBA, standard ToupH electrode 9165S-10D manufactured by HORIBA, temperature: 25° C.).

(2) Evaluation on Corrosive Properties of Cobalt (Co)

The etching rate (ER) (angstrom/min) of a Co blanket wafer immersed in each of the cleaning compositions for semiconductor substrates obtained in Examples and Comparative Examples was calculated by the following method.

A PVD-Co blanket wafer manufactured by a domestic manufacturer was cut into a 2-cm square and immersed in 10 g of the cleaning composition for semiconductor substrates weighed out in a polypropylene (PP) vessel at 45° C. for 1 minute. After immersion, the cut Co blanket wafer was taken out from the cleaning composition for semiconductor substrates, and the concentration of Co ions contained in the cleaning composition for semiconductor substrates was measured by ICP-AES. From the measured value, the film thickness of Co dissolved was calculated, and the value was divided by the treatment time to calculate the etching rate.

As the value of the etching rate decreases, the corrosion of cobalt is more suppressed, which is preferable.

Incidentally, the effect of suppressing corrosion (corrosion inhibiting properties) of the corrosion inhibitor (B) and the like (the corrosion inhibitor (B) and a compound in Comparative Examples) may be determined as follows. In the case where the corrosion inhibitor (B) or the like is added (for example, Examples 1 to 10 and Comparative Examples 2 to 9), the corrosion inhibitor (B) or the like (the corrosion inhibitor (B) and a compound in Comparative Examples) has an effect of suppressing corrosion (corrosion inhibiting properties), when the value of etching rate is less than ½ (50%) of the value of etching rate in the case where no corrosion inhibitor (B) or the like is added (for example, Comparative Example 1).

(3) Evaluation on Removability of Organosiloxane-Based Sacrificial Layer

In the cleaning composition for semiconductor substrates obtained in each of Examples and Comparative Examples, a blanket wafer with an organosiloxane-based thin film having a film thickness of 2000 angstrom was immersed at 45° C. for 10 seconds. The film thickness of the thin film was then measured by using an n&k analyzer 1280 manufactured by n&k Technology Inc. In the case of a film thickness of 0 angstrom, removal of the organosiloxane-based sacrificial layer is achieved, so that the cleaning composition for semiconductor substrates has excellent removability of sacrificial layer.

<Cleaning Composition for Semiconductor Substrates>

Example 1

A cleaning composition for semiconductor substrates was obtained by compounding 16 parts by mass of tetramethylammonium hydroxide, 0.15 parts by mass of potassium hydroxide, 25 parts by mass of glycerol, and 2.0 parts by mass of 4-bromo-1H-pyrazole as the corrosion inhibitor (B) and diluting the mixture with ultrapure water to make 100 parts by mass of the total. In Table 1, the amount of each component compounded is shown by percentage. The resulting cleaning composition for semiconductor substrates was used to evaluate the corrosive properties of cobalt. The results are shown in Table 1.

Further, the resulting cleaning composition for semiconductor substrates was used to evaluate the removability of an organosiloxane-based sacrificial layer, and the sacrificial layer was able to be removed.

The content of the corrosion inhibitors (B) used in Examples and the content of the compounds used in Comparative Examples are shown in mass percentage (mass %) relative to the cleaning composition for semiconductor substrates in the column "Corrosion inhibitor (B), etc." in Table 1 and Table 2. Also, the content of each component is shown in mass percentage (mass %) relative to the cleaning composition for semiconductor substrates in "Composition of cleaning composition" in Table 1 and Table 2.

Examples 2 to 10

A cleaning composition for semiconductor substrates was obtained in the same manner as in Example 1 except that the compound shown in the column "Corrosion inhibitor (B), etc." in Table 1 in an amount shown in Table 1 was compounded instead of 2.0 parts by mass of 4-bromo-1H-pyrazole as the corrosion inhibitor (B). The resulting cleaning composition for semiconductor substrates was used to evaluate the corrosive properties of cobalt. The results are shown in Table 1.

Incidentally, the cleaning compositions for semiconductor substrates obtained in Examples 2 to 10 were used to evaluate the removability of an organosiloxane-based sacrificial layer, and the sacrificial layer was able to be removed by any of them.

Comparative Example 1

A cleaning composition for semiconductor substrates was obtained in the same manner as in Example 1 except that 4-bromo-1H-pyrazole was not compounded. The resulting cleaning composition for semiconductor substrates was used to evaluate the corrosive properties of cobalt. The results are shown in Table 1.

Comparative Examples 2 to 9

A cleaning composition for semiconductor substrates was obtained in the same manner as in Example 1 except that the compound shown in the column "Corrosion inhibitor (B), etc." in Table 1 in an amount shown in Table 1 was compounded instead of 2.0 parts by mass of 4-bromo-1H-pyrazole. The resulting cleaning composition for semiconductor substrates was used to evaluate the corrosive properties of cobalt. The results are shown in Table 1.

TABLE 1

| | Corrosion inhibitor (B), etc. | Amount compounded (mass %) | Co ER (Å/min) |
|---|---|---|---|
| Example 1 | 4-Bromo-1H-pyrazole | 2.0 | 1.6 |
| Example 2 | 2-(4-Thiazolyl)benzimidazole | 1.0 | 2.8 |
| Example 3 | 4-Chloro-1H-pyrazole | 2.0 | 0.9 |
| Example 4 | 4-Methylpyrazole | 2.0 | 1.1 |
| Example 5 | 8-Hydroxy-7-iodoquinoline-5-sulfonic acid | 2.0 | 4.3 |
| Example 6 | 5-Chloro-8-hydroxy-7-iodoquinoline | 0.2 | 0.4 |
| Example 7 | 5-Chloro-8-hydroxyquinoline | 0.5 | 4.6 |
| Example 8 | 7-Bromo-5-chloro-8-hydroxyquinoline | 0.2 | 0.4 |
| Example 9 | Potassium tris(1-pyrazolyl)borohydride | 0.2 | 1.4 |
| Example 10 | 5,7-Diiodo-8-hydroxyquinoline | 0.2 | 0.4 |

TABLE 1-continued

| | Corrosion inhibitor (B), etc. | Amount compounded (mass %) | Co ER (Å/min) |
|---|---|---|---|
| Comparative Example 1 | None | — | 21.4 |
| Comparative Example 2 | Pyrazole | 1.0 | 30.3 |
| Comparative Example 3 | 3,4,5-Tribromopyrazole | 1.0 | 20.7 |
| Comparative Example 4 | 7-Bromoquinoline | 0.2 | 20.3 |
| Comparative Example 5 | 3-Amino-1,2,4-triazole | 2.0 | 21.9 |
| Comparative Example 6 | 5-Chlorobenzotriazole | 2.0 | 14.5 |
| Comparative Example 7 | 2-Mercaptobenzimidazole | 2.0 | 16.0 |
| Comparative Example 8 | 3-Bromo-1H-pyrazole | 2.0 | 17.1 |
| Comparative Example 9 | 3-Amino-1,2,4-triazole-5-carboxylic acid | 2.0 | 22.4 |

*) Composition of cleaning composition: 16 mass % of tetramethylammonium hydroxide, 0.15 mass % of potassium hydroxide, 25 mass % of glycerol, and balance of water.
*) pH (25° C.): 14 (Examples 1 to 10 and Comparative Examples 1 to 9)

Example 11

A cleaning composition for semiconductor substrates was obtained by compounding 12 parts by mass of tetramethylammonium hydroxide, 4 parts by mass of potassium hydroxide, 25 parts by mass of glycerol, and 2.0 parts by mass of 4-bromo-1H-pyrazole as the corrosion inhibitor (B) and diluting the mixture with ultrapure water to make 100 parts by mass of the total. In Table 2, the amount of each component compounded is shown by percentage. The resulting cleaning composition for semiconductor substrates was used to evaluate the corrosive properties of cobalt. The results are shown in Table 2.

Examples 12 to 20

A cleaning composition for semiconductor substrates was obtained in the same manner as in Example 11 except that the compound shown in the column "Corrosion inhibitor (B), etc." in Table 2 in an amount shown in Table 2 was compounded instead of 2.0 parts by mass of 4-bromo-1H-pyrazole as the corrosion inhibitor (B). The resulting cleaning composition for semiconductor substrates was used to evaluate the corrosive properties of cobalt. The results are shown in Table 2.

Comparative Example 10

A cleaning composition for semiconductor substrates was obtained in the same manner as in Example 11 except that 4-bromo-1H-pyrazole was not compounded. The resulting cleaning composition for semiconductor substrates was used to evaluate the corrosive properties of cobalt. The results are shown in Table 2.

Comparative Examples 11 to 18

A cleaning composition for semiconductor substrates was obtained in the same manner as in Example 11 except that the compound shown in the column "Corrosion inhibitor (B), etc." in Table 2 in an amount shown in Table 2 was compounded instead of 2.0 parts by mass of 4-bromo-1H-pyrazole. The resulting cleaning composition for semiconductor substrates was used to evaluate the corrosive properties of cobalt. The results are shown in Table 2.

TABLE 2

| | Corrosion inhibitor (B), etc. | Amount compounded (mass %) | Co ER (Å/min) |
|---|---|---|---|
| Example 11 | 4-Bromo-1H-pyrazole | 2.0 | 0.5 |
| Example 12 | 2-(4-Thiazolyl)benzimidazole | 1.0 | 0.9 |
| Example 13 | 4-Chloro-1H-pyrazole | 2.0 | 0.3 |
| Example 14 | 4-Methylpyrazole | 2.0 | 0.9 |
| Example 15 | 8-Hydroxy-7-iodoquinoline-5-sulfonic acid | 2.0 | 4.5 |
| Example 16 | 5-Chloro-8-hydroxy-7-iodoquinoline | 0.2 | 5.0 |
| Example 17 | 5-Chloro-8-hydroxyquinoline | 0.5 | 1.9 |
| Example 18 | 7-Bromo-5-chloro-8-hydroxyquinoline | 0.2 | 4.1 |
| Example 19 | Potassium tris(1-pyrazolyl)borohydride | 0.2 | 1.9 |
| Example 20 | 5,7-Diiodo-8-hydroxyquinoline | 0.2 | 9.5 |
| Comparative Example 10 | None | — | 20.0 |
| Comparative Example 11 | Pyrazole | 1.0 | 23.7 |
| Comparative Example 12 | 3,4,5-Tribromopyrazole | 1.0 | 15.7 |
| Comparative Example 13 | 7-Bromoquinoline | 0.2 | 18.8 |
| Comparative Example 14 | 3-Amino-1,2,4-triazole | 2.0 | 31.0 |
| Comparative Example 15 | 5-Chlorobenzotriazole | 2.0 | 17.7 |
| Comparative Example 16 | 2-Mercaptobenzimidazole | 2.0 | 18.3 |
| Comparative Example 17 | 3-Bromo-1H-pyrazole | 2.0 | 20.8 |
| Comparative Example 18 | 3-Amino-1,2,4-triazole-5-carboxylic acid | 2.0 | 23.0 |

*) Composition of cleaning composition: 12 mass % of tetramethylammonium hydroxide, 4 mass % of potassium hydroxide, 25 mass % of glycerol, and balance of water.
*) pH (25° C.): 14 (Examples 11 to 20 and Comparative Examples 10 to 18)

From the results shown in Table 1 and Table 2, it is evident that the cleaning compositions for semiconductor substrates of the present invention be capable of suppressing the corrosion of cobalt in cleaning of a semiconductor substrate containing cobalt. Based on the results, it is evident that the cleaning compositions for semiconductor substrates of the present invention be useful as a cleaning agent capable of removing a photoresist pattern or dry etching residues while suppressing the corrosion of cobalt or a cobalt alloy. Although the cleaning compositions used in Examples in Table 1 and the cleaning compositions used in Examples in Table 2 have a different content of alkaline compounds, all of them have excellent effect for suppressing the corrosion of cobalt, so that it can be seen that the cleaning may be achieved under various cleaning conditions for various objects while suppressing the corrosion of cobalt.

The compounds used in Comparative Examples were incapable of sufficiently suppressing the corrosion of cobalt, though the compounds were similar to the compounds used as the corrosion inhibitor (B) in the cleaning compositions for semiconductor substrates in Examples.

The invention claimed is:

1. A cleaning composition for semiconductor substrates, comprising an alkaline compound (A), a corrosion inhibitor (B), an organic solvent (C), and water, wherein the alkaline compound (A) is at least one selected from the group consisting of a quaternary ammonium hydroxide (Al) and potassium hydroxide (A2), the corrosion inhibitor (B) is at least one selected from the group consisting of 4-chloro-1H-pyrazole, 5-chloro-8-hydroxy-7-iodoquinoline, 7-bromo-5-chloro-8-hydroxyquinoline, and 5.7-diiodo-8-hydroxyquinoline, the organic solvent (C) is at least one selected from the group consisting of an alkylene glycol alkyl ether and an alcohol, and a content of the organic solvent (C) in the cleaning composition for semiconductor substrates is 10 to 37 mass %.

2. The cleaning composition for semiconductor substrates according to claim 1, wherein a content of the alkaline compound (A) in the cleaning composition for semiconductor substrates is 0.005 to 35 mass %.

3. The cleaning composition for semiconductor substrates according to claim 1, wherein a content of the corrosion inhibitor (B) in the cleaning composition for semiconductor substrates is 0.05 to 3 mass %.

4. The cleaning composition for semiconductor substrates according to claim 1, wherein a content of water in the cleaning composition for semiconductor substrates is 7 to 99.945 mass %.

5. The cleaning composition for semiconductor substrates according to claim 1, having a pH of 7 or more.

6. The cleaning composition for semiconductor substrates according to claim 1, wherein the alkaline compound (A) contains the quaternary ammonium hydroxide (Al), which is at least one selected from the group consisting of tetramethylammonium hydroxide, tetraethylammonium hydroxide, tetrapropylammonium hydroxide, tetrabutylammonium hydroxide, and benzyltrimethylammonium hydroxide.

7. The cleaning composition for semiconductor substrates according to claim 1, wherein the semiconductor substrates contain cobalt.

8. A method of cleaning a semiconductor substrate containing cobalt, the method comprising applying the cleaning composition for semiconductor substrates according to claim 1 to the semiconductor substrate.

9. A method of cleaning a semiconductor substrate, the method comprising removing at least one selected from the group consisting of a dry etching residue and a photoresist in the semiconductor substrate by using the cleaning composition for semiconductor substrates according to claim 1.

10. A method for producing a semiconductor substrate, the method comprising removing at least one selected from the group consisting of a dry etching residue and a photoresist in the semiconductor substrate by using the cleaning composition for semiconductor substrates according to claim 1.

11. A method for suppressing corrosion of cobalt, the method comprising cleaning a semiconductor substrate containing cobalt by using at least one corrosion inhibitor (B) selected from the group consisting of 4-chloro-1H-pyrazole, 5-chloro-8-hydroxy-7-iodoquinoline, 7-bromo-5-chloro-8-hydroxyquinoline, and 5.7-diiodo-8-hydroxyquinoline and a composition containing water, at least one alkaline compound (A) selected from the group consisting of a quaternary ammonium hydroxide (Al) and potassium hydroxide (A2), and at least one organic solvent (C) selected from the group consisting of an alkylene glycol alkyl ether and an alcohol, wherein, relative to a total mass content of the corrosion inhibitor (B) and the composition, a content of the organic solvent (C) is 10 to 37 mass %.

12. The cleaning composition for semiconductor substrates according to claim 1, wherein the alkaline compound (A) contains both the quaternary ammonium hydroxide (A1) and potassium hydroxide (A2), and a mass ratio (Al)/(A2) is 10 or more.

13. The cleaning composition for semiconductor substrates according to claim 1, wherein the alkaline compound (A) contains both the quaternary ammonium hydroxide (Al) and potassium hydroxide (A2), a mass ratio (Al)/(A2) is less than 10, and the corrosion inhibitor (B) is 4-chloro-1H-pyrazole.

* * * * *